Figure 1:
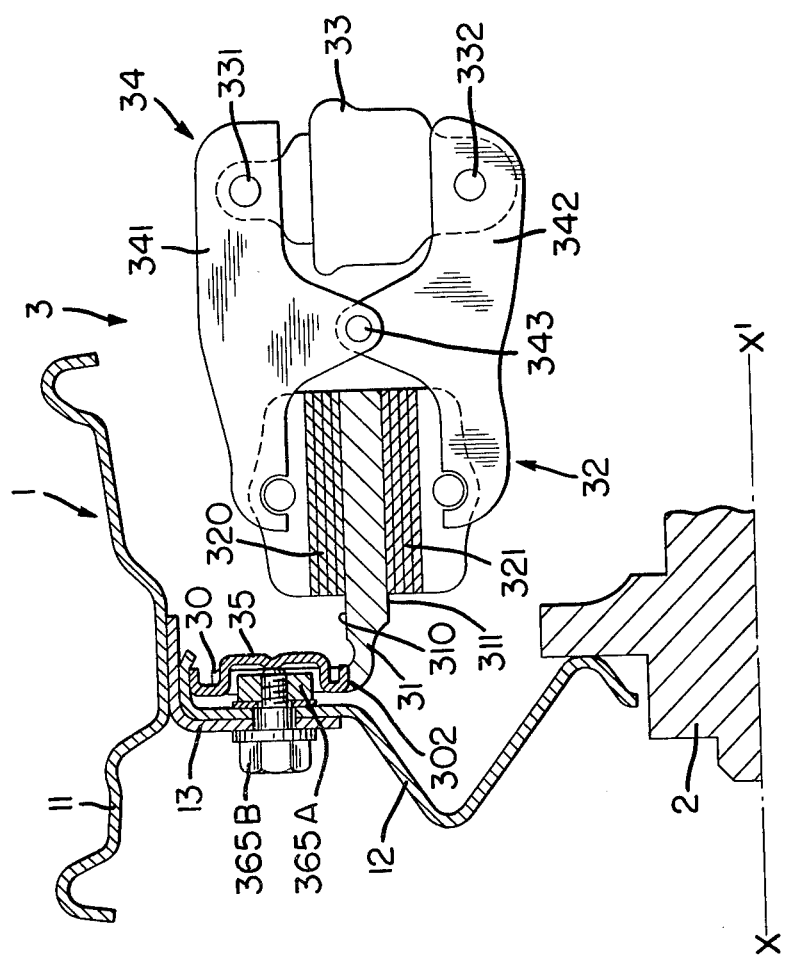

United States Patent [19]

Jamon

[11] Patent Number: 4,477,120
[45] Date of Patent: Oct. 16, 1984

[54] CROWN BRAKE WITH CROWN FASTENED TO THE WHEEL

[75] Inventor: Jacques Jamon, Cébazat, France

[73] Assignee: Compagnie Generale des Etablissements Michelin, Clermont-Ferrand, France

[21] Appl. No.: 455,303

[22] Filed: Jan. 3, 1983

[30] Foreign Application Priority Data

Jan. 18, 1982 [FR] France ................................ 82 00940

[51] Int. Cl.³ ............................................. F16D 55/12
[52] U.S. Cl. ..................................... 301/6 W; 188/76; 301/6 R
[58] Field of Search ................... 188/76, 18 R, 218 R; 301/6 R, 6 W, 6 WB

[56] References Cited

U.S. PATENT DOCUMENTS

| | | | |
|---|---|---|---|
| 1,469,593 | 10/1923 | Hatashita | 301/6 W |
| 1,611,664 | 12/1926 | Murray | 301/6 W |
| 1,624,112 | 4/1927 | Murray | 301/6 W |
| 1,850,345 | 3/1932 | Eksergian | 301/6 W |

FOREIGN PATENT DOCUMENTS

| | | | |
|---|---|---|---|
| 2160935 | 6/1972 | Fed. Rep. of Germany | 188/76 |
| 2001718 | 2/1979 | United Kingdom | 188/76 |

*Primary Examiner*—David A. Scherbel
*Attorney, Agent, or Firm*—Brumbaugh, Graves, Donohue & Raymond

[57] ABSTRACT

A crown brake has its crown attached to a wheel disk by at least three connecting pieces comprising a radially flexible portion and an axially flexible portion in order to simplify the attachment of the crown to the wheel and to avoid repercussion of deformations of the wheel upon the crown.

3 Claims, 4 Drawing Figures

CROWN BRAKE WITH CROWN FASTENED TO THE WHEEL

The present invention relates to improvements in wheels comprising a rim provided with a tire and a disk which connects the rim to the hub of a vehicle axle, as well as to the braking systems which cooperate with these wheels.

Among the known systems of braking, a disk brake has at least one disk perpendicular to the axis of the wheel and rotating with it and at least one pair of brake-lined jaws fixed with respect to the disk and which clamp on the disk upon each braking maneuver. Furthermore, a crown brake has essentially a cylindrical crown which, at standstill, is coaxial with the wheel and the hub of the vehicle and is rigidly connected in rotation with them, and at least one pair of brake-lined jaws which clamp on the crown upon each braking maneuver.

One of the well-known advantages of the crown brake is that it takes up less space, for the same effect, than the disk brake. As a matter of fact, it permits a decrease in the diameter of the interior of the wheels for a diameter of the brake track which is definitely greater than that of a disk brake. This advantage is further increased by using jaws actuated by a clamp instead of a mechanism which acts directly on the friction linings of the brake and, therefore, takes up more space in radial direction. On the other hand, the brake crown, when it is connected to the wheel, becomes sensitive to elastic deformations of the wheel which result from the driving of the vehicle.

In the known crown brakes, the brake crown is attached to the hub. On the other hand, it is simpler and therefore more economical to attach the brake crown to the wheel disk. However, such a structure subjects the brake crown to the influence of the deformations of the wheel disk and creates a heat exchange between the brake crown and the wheel unfavorable to the tire with which the wheel may be equipped.

It is acceptable that the axis of rotation of the crown no longer coincide with that of the hub. On the other hand, it is prejudical to the operation of the crown brake for the crown to be deformed, in particular ovalized, warped or subjected to a lack of cylindricity. Braking maneuvers carried out during the deformations of the crown result in local wear of the crown. This local wear in its turn produces parasitic vibrations and unsatisfactory operation of the brake.

The object of the invention is to interpose between the wheel disk and the brake crown a deformable element the function of which is to absorb the disturbing deformations of the wheel disk without letting them react on the crown, while assuring full transmission of the braking torque to the wheel and ease of mounting of the crown.

For this purpose, the invention provides a crown brake comprising a crown and at least one jaw having two linings, one arranged radially outwards and the other radially inwards of the crown, the jaw being rigidly connected to a vehicle and the crown being rigidly connected to a wheel and coaxial with it, the wheel having a rim and a wheel disk, this brake being characterized by the fact that the crown is connected to the wheel disk by means of n connecting pieces (n being equal to or greater than 3) arranged at the periphery of the crown and spaced from each other by an angle of $2\pi/n$ radian referred to the axis of rotation of the assembly formed by the wheel and the crown; and by the fact that each of the connecting pieces comprises at least one so-called flexible element arranged between, on the one hand, an attachment of this element to the wheel disk and, on the other hand, an attachment of this element to the brake crown and formed of a segment which is flexible in radial direction of the wheel and of a segment which is flexible in axial direction of the wheel, the radially flexible segment being adjacent to the axially flexible segment.

Preferably, but not necessarily, the axially flexible segment is rigidly connected to the rigid attachment of the connecting piece to the wheel disk. This permits better structural transition between the axially flexible segment of the wheel and the rigid attachment of the connecting piece to the wheel.

The invention makes it possible to provide a removable rim, for instance for the repair of damage to the tire with which the wheel is equipped. Thus the wheel disk and the brake crown can remain in place on the hub of the vehicle. The attachment of the brake crown to the disk furthermore decreases the complexity and therefore the cost of the hub as compared with a hub which bears both the brake crown and the wheel disk.

The accompanying drawing illustrates one embodiment of the invention. In this drawing (not drawn to scale)

Figure 3:
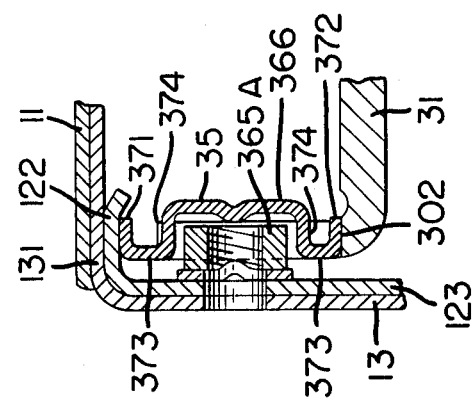
Figure 2:
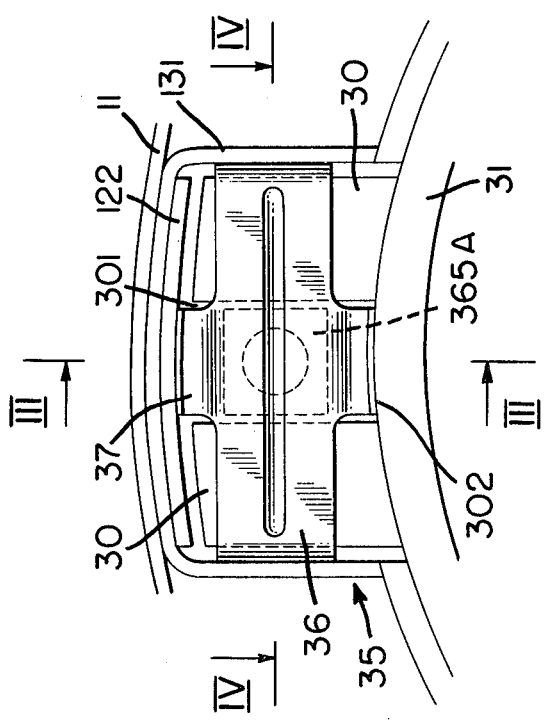
Figure 4:
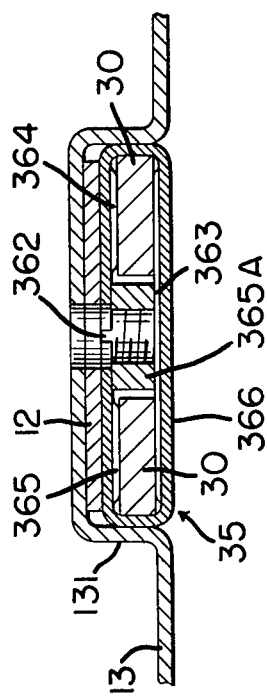

FIG. 1 is a radial section through a crown brake in accordance with the invention, FIG. 2 is an axial section through a connecting piece which, in accordance with the invention, fastens the brake crown to the wheel disk, FIG. 3 is a radial section through the connecting piece along the plane III—III of FIG. 2, and FIG. 4 is a section through the connecting piece along the plane IV—IV of FIG. 2, perpendicular to the radial section plane.

FIG. 1 shows a tire wheel 1 fastened on a hub 2 and equipped with a crown brake 3 in accordance with the invention.

The wheel 1 of axis XX' is formed of a rim 11 and a disk 12. This disk 12 is fastened to the hub 2 (shown in part) radially inward of the brake crown 31.

The crown brake 3 comprises a crown 31 with two cylindrical braking tracks 310 and 311 coaxial to the wheel 1, a jaw 32 with friction linings 320 and 321 and a hydraulic jack 33. A friction lining 320 arranged radially outward of the crown 32 cooperates with the corresponding braking path 310, while the other friction lining 321 which is radially inward of the crown 31 cooperates with the other corresponding braking path 311.

The jaw 32 (shown in braking position) forms the terminal part, radially inward of the wheel rim 11, of a clamp 34 formed of two levers 341 and 342 connected by an axis of articulation 343 located between the jack 33 and the friction linings 320 and 321. This axis of articulation 343 is rigidly connected to the vehicle (not shown). The two axially outer arms (referred to the vehicle) of the clamp 34 each bears one of the friction linings 320, 321. The hydraulic jack 33 acts on the two axially inner arms of the clamp 34 via the pins 331 and 332.

The brake crown 31 is provided on its periphery within the wheel 1 with a number of radial extensions 30 embedded in a connecting piece 35 in accordance with the invention.

The connecting piece 35 is cross-shaped (FIGS. 2-4). It is made of metal plate, for instance steel, by bending and stamping. One branch of the connecting piece or cross 35, the long one 36, is oriented circumferentially, while the other branch, the short one 37, is oriented radially.

The long branch 36 forms a rectangular bracelet (FIG. 4) interrupted by a radial slit 362 at its axially outer part (referred to the vehicle).

On the inside, this slit bracelet 36 has three longitudinal ribs 363, 364, 365, one 363 on its axially inner face 366, and two others 364, 365 on its axially outer face interrupted by the radial slit 362. The axial distance between the axially inner rib 363 and the axially outer ribs 364, 365 is equal to the axial thickness of the radial extensions 30, two in number, of the outer periphery of the crown 31, so that the two radial extensions 30 fit with hard friction in the slit bracelet 36 of the connecting piece or cross 35.

A nut 365A, which is housed within the slit bracelet 36, and a bolt 365B assure the axial fastening of the slit bracelet 36 to the wheel disk 12 and, in this example, of this disk 12 to the rim 11 by means of the lug 13 welded to the bottom of the rim 11 (FIG. 1). In the circumferential direction, the slit bracelet 36 of the connecting piece or cross 35 is immobilized at its two longitudinal ends by embedment in a stamping 131 forming the attachment lug 13 of the rim 11, located at the periphery of the wheel disk 12. The assembly of the slit bracelet 36 with its three ribs 363, 364, 365 and its circumferential ends or abutments fitted in the stamping 131 form the element for the rigid attachment of the connecting piece or cross 35 in accordance with the invention to the wheel disk 12.

The two radial extensions 30 of the outer periphery of the brake crown 31 are separated in circumferential direction by a notch 301 which is open radially towards the outside in such a manner as to be able to house therein the nut 365A of the axial attachment of the slit bracelet 36 to the wheel disk 12. The notch 301 is closed by its radially inner face 302 approximately at the level of the radially outer cylindrical braking track 310.

The wheel disk 12 comprises a branch 123 with a radially outer cylindrical portion 122 in contact with the inside of the stamping 131 forming the attachment lug 13 of the rim 11.

The short branch 37 of the connecting piece or cross 35 with its radially outer end 371 and its radially inner end 372 is fitted between the radially outer cylindrical portion 122 of the branch 123 of the wheel disk 12 and the radially inner face 302 of the notch 301 of the brake crown 31. The two ends 371, 372 of the shortbranch 37 of the connecting piece or cross 35 each form, in cooperation with the three inner ribs 363, 364, 365 of the long branch or slit bracelet 36 of the connecting piece or cross 35, a radial fastening or immobilization element for the locking of the connecting piece or cross 35 of the brake crown 31 to the wheel disk 12, in accordance with the invention. Between each of its respective ends 371, 372, the short branch 37 of the connecting piece or cross 35 has, first of all, a radial segment or portion 373 which is offset axially with reference to the axially inner face 366 of the long branch or slit bracelet 36 of the connecting piece or cross 35. These radial segments 373 are, in accordance with the invention, flexible in axial direction and rigid in radial direction. Each of these radial segments 373 is connected to the axially inner face 366 of the long branch or slit bracelet 36 of the connecting piece or cross 35 by means of an axial segment or portion 374. According to the invention, these axial segments 374 are flexible in radial direction and rigid in axial direction. The radial flexibility of the axial segments 374 is, however, limited so as to assure constancy of the embedding of the short branch 37 of the connecting piece or cross 35 between the brake crown 31 and the wheel disk 12. Thus the two rigid attachment elements with the flexible segments 373, 374 in accordance with the invention eliminate possible deformations of the brake crown 31 caused by deformations of the wheel 1, and in particular of the wheel disk 12, when the brake crown 31 is seized between the two friction linings 321, 322 upon a braking maneuver. Furthermore, the fastening of the brake crown 31 to the wheel disk 12 radially outward of the attachment device (not shown) fastening the wheel disk 12 to the hub 2 makes it possible to decrease the weight of this device, since the braking forces arising between the brake crown 31 and the wheel disk 12 do not affect this device.

What is claimed is:

1. A crown brake comprising a crown and at least one jaw having two linings, one arranged radially outwards and the other radially inwards of the crown, the jaw being rigidly connected to a vehicle and the crown being rigidly connected to a wheel and coaxial to it, the wheel having a rim and a wheel disk, characterized
   by the fact that the crown is connected to the wheel disk by means of n connecting pieces (n being equal to or greater than 3) arranged at the periphery of the crown and spaced from each other by an angle of $2\pi/n$ radian referred to the axis of rotation of the assembly formed by the wheel and the crown; and
   by the fact that each of the connecting pieces comprises at least one flexible element arranged between, on the one hand, means for attaching this element to the wheel disk and, on the other hand, means for attaching this element to the brake crown and formed of a portion which is flexible in the radial direction of the wheel and of portion which is flexible in the axial direction of the wheel, the radially flexible portion being adjacent to the axially flexible portion.

2. A brake according to claim 1, characterized by the fact that the axially flexible portion is rigidly connected to an element fastening the connecting piece to the wheel disk.

3. A brake according to claim 1 or 2, characterized by the fact that the connecting pieces comprise two flexible elements, each formed of a portion which is flexible in the radial direction of the wheel and of a portion which is flexible in the axial direction of the wheel.

* * * * *